W. H. SAMPSON.
TIRE CASING.
APPLICATION FILED MAR. 21, 1918.
1,286,121.
Patented Nov. 26, 1918.
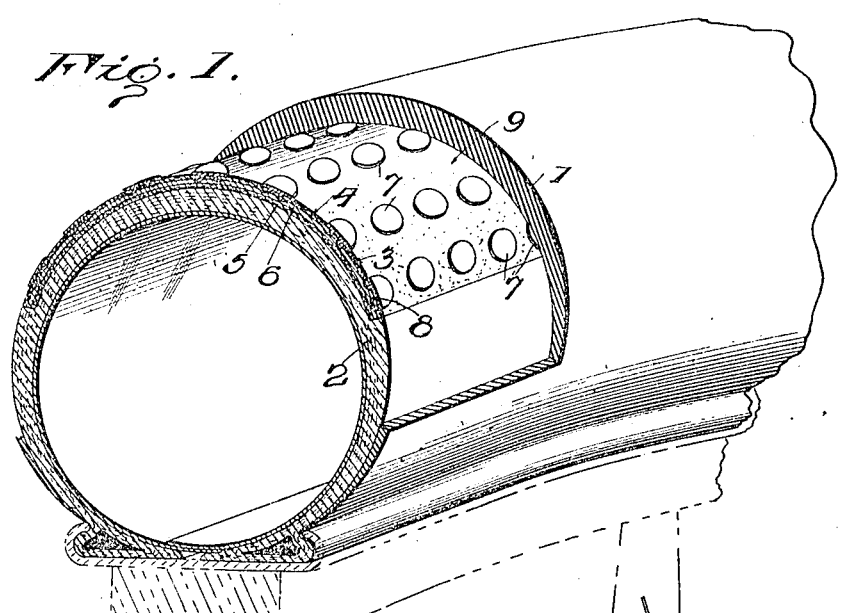
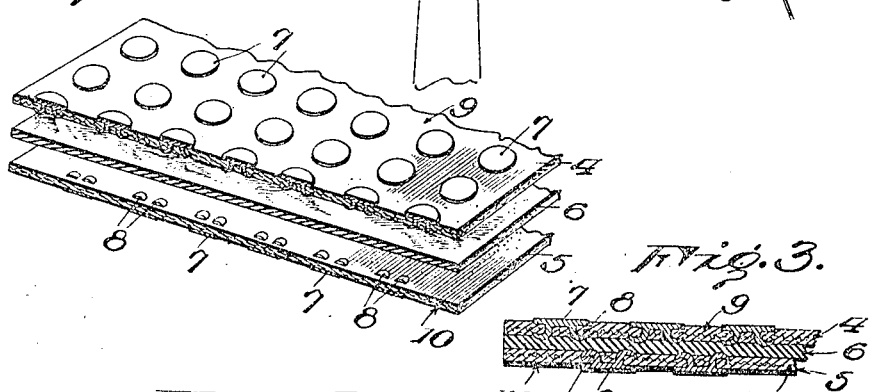
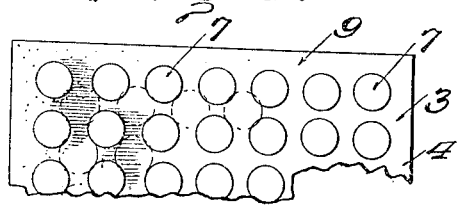
Inventor
W. H. Sampson
By Lacey & Lacey, Attorneys

UNITED STATES PATENT OFFICE.

WILLIAM H. SAMPSON, OF GRAND ISLAND, NEBRASKA.

TIRE-CASING.

1,286,121.

Specification of Letters Patent.  Patented Nov. 26, 1918.

Application filed March 21, 1918.  Serial No. 223,805.

*To all whom it may concern:*

Be it known that I, WILLIAM H. SAMPSON, a citizen of the United States, residing at Grand Island, in the county of Hall and State of Nebraska, have invented certain new and useful Improvements in Tire-Casings, of which the following is a specification.

This invention relates to casings for pneumatic tires and more particularly to casings of the armored type, the primary object of the invention being, of course, to provide a casing which will be practically proof against puncture and blow-outs and which will not become frayed or torn after its tread surface has been worn down to a considerable extent. Tire casings of the class to which the casing embodying my invention belongs have metallic armor elements suitably arranged therein, which elements are in the nature of rivets having flat sided heads provided upon their under sides with prongs which are to be riveted down in securing the elements to one or another of the layers which go to make up the casing as a whole. The employment of armor elements of this general description, however, has been found to, in most instances, present the disadvantage that the riveted down prongs of the said elements are liable to wear through the layer or lamina of the casing with which they are in contact, thus not only impairing the strength and durability of the casing through undue wear thereof, but also causing undesirable friction. Of course, the flat sided heads of the armor elements do not present this disadvantage, for their exposed faces are smooth and therefore present no sharp edges or points to the laminæ of the casing with which they are in contact. It is therefore an object of the present invention to provide for anchorage of armor elements of the general structure above mentioned in such manner that they will not present the disadvantage referred to but will on the other hand serve only the useful purpose of rendering the casing substantially proof against puncture and blow-outs.

More specifically the invention has as its object to provide, in a tire casing, a composite armor strip of such construction and having the armor elements anchored thereto in such a manner that the prongs of the said elements will be completely embedded within the strip, the flat smooth heads only of the said anchoring elements being presented at the opposite faces of the strip so that the presence of the armor elements will not be likely to result in wear of the tread lamina of the casing or the inner fabric laminæ or carcass.

A further object of the invention is to so construct the armor strip that the component layers thereof, the tread lamina, and the fabric or composite inner laminæ may be substantially integrally united in the process of vulcanization so that there can be no relative movement of the laminæ with the consequent production of friction.

In the accompanying drawings:

Figure 1 is a sectional perspective view of a tire casing constructed in accordance with the present invention;

Fig. 2 is a perspective view illustrating the layers comprising the composite armor strip in position about to be assembled;

Fig. 3 is an enlarged vertical transverse sectional view through a portion of the composite strip in its finished condition and before its vulcanization within the casing;

Fig. 4 is a plan view of a portion of the strip, the said view illustrating in full and dotted lines the arrangement of the armor elements, respectively, upon the outer and inner faces of the said strip.

The tire casing illustrated in the drawings embodies the usual tread lamina which is indicated by the numeral 1 and which is ordinarily of rubber, and the usual carcass which is indicated by the numeral 2 and which is ordinarily built-up of rubberized fabric laminæ, the armor strip embodying the present invention being interposed between the sections 1 and 2 and being indicated in general by the numeral 3.

The armor strip embodying the present invention comprises an outer layer or lamina 4, an inner layer 5, and an intermediate layer 6. The inner and outer layers 4 and 5 are in the nature of strips of rubberized canvas or other fabric suitable for the purpose, and carry the armor elements. The elements are in the nature of rivets and each comprises a flat sided circular head 7 provided upon one face with rivet prongs 8 which are to be struck-down in opposite directions in riveting the element to the layer 4 or 5, as the case may be. The outer face of the layer or strip 4 is indicated by the numeral 9 and in applying the armor elements to this layer or strip, the said elements are riveted thereto with their prongs 8 clenched at the inner side or face of the said layer or strip and with their heads seating flush in the outer face 9 of the said layer or strip. It will be observed by reference to the drawings that the said elements are furthermore arranged in transverse parallel series and relatively close together, the distance between the peripheries of the heads of adjacent ones of the said elements being not greater, or slightly less than the diameter of the head of any one of the elements. The outer face of the layer or strip 5 is indicated by the numeral 10, and in assembling the armor elements with this strip the said elements are riveted thereto in such manner that their heads 7 will lie flush within the said outer face of the layer or strip and their prongs 8 will be clenched against the inner face of the said layer or strip. As in the instance of the armor elements upon the strip 4, the armor elements upon the strip 5 are arranged in series extending transversely of the strip and spaced similarly to the first-mentioned elements but the arrangement in the latter instance is such that when the strips 4 and 5 are united in the manner which will be presently explained, the heads of the elements upon the strip 5 will be located between the heads of the elements upon the strip 4, as clearly shown in Fig. 4 of the drawings, the peripheries of the heads describing circles which either meet or slightly overlap as shown in the said figure so that substantially all portions of the area of the composite armor strip will resist the passage of a nail or other sharp object which would be likely to cause puncture.

Returning now to a consideration of Fig. 2 of the drawings in which the strips 4 and 5 are illustrated as arranged in the relative positions which they will occupy in the completed armor strip, it will be observed that the prongs 8 of the armor elements are presented at the faces of the strips 4 and 5 which oppose each other. As before stated, the strip 6 is interposed between the strips 4 and 5 and the said strip 6, is of soft rubber so that when the strips 4, 5 and 6 are arranged in contact and vulcanized, the rivet prongs 8 of the armor elements will become embedded in the faces of the said strip 6 and at the same time the said strip will become substantially integrally united with the strips 4 and 5. Thus in the completed armor strip the rivet prongs of the armor elements are completely embedded therein and only the flat and smooth faces of the heads of the said elements are presented at the opposite faces or sides of the strip. The armor strip having been prepared as above described it is, of course, to be interposed between the carcass 2 and the tread 1 and the entire casing is then vulcanized in the usual manner so as to produce an integral whole.

Of course, I am not to be limited to armor elements having heads of any particular shape or dimensions, nor to the use of the particular rivet prongs illustrated in the drawings, the salient feature of the invention residing in the arrangement of the armor elements in the composite strip in such a manner that the smooth faced heads of the elements only, will be presented at the faces of the said strip so as to avoid undue wear of the carcass 2 or tread 1.

Having thus described the invention, what is claimed as new is:

1. A composite armor strip for a tire casing comprising united outer and inner layers of material, and armor elements secured to the layers independently and having smooth faced heads presented at the exposed faces of the respective layers.

2. A composite armor strip for a tire casing comprising united outer and inner layers of material, and armor elements secured to the layers independently and having flat faced heads presented flush with the exposed faces of the respective layers.

3. A composite armor strip for a tire casing comprising united outer and inner layers of material, and armor elements having heads presented at the exposed faces of the respective layers, shank portions secured through the layers independently, and rivet portions located between the layers.

4. A composite armor strip for a tire casing comprising layers of material, armor elements carried by each layer independently and each element having a flat faced head presented at the exposed face of the respective layer and a securing rivet portion presented at the inner face of the respective layer, and means uniting the inner faces of the layers.

5. A composite armor strip for a tire casing comprising layers of material, armor elements carried by each layer and each element having a flat faced head presented at the exposed face of the respective layer and a securing rivet portion presented at the inner face of the respective layer, and means uniting the inner faces of the layers and embedding the said securing rivet portions.

6. A composite armor strip for a tire casing comprising united outer, inner, and intermediate layers of material, the intermediate layer being of rubber, and armor elements having heads located at the exposed faces of the outer and inner layers and securing rivet portions located at the inner faces of the said layers and contacting the faces of the intermediate layer.

7. A composite armor strip for a tire casing comprising integrally united outer, inner, and intermediate layers of material, the outer and inner layers being of rubberized fabric and the intermediate layer being of rubber, and armor elements having heads presented at the outer faces of the outer and inner layers and rivet portions secured through the respective outer and inner layers and presented at the inner face thereof and embedded in the intermediate layer.

In testimony whereof I affix my signature.

WILLIAM H. SAMPSON. [L. S.]

Copies of this patent may be obtained for five cents each, by addressing the "Commissioner of Patents, Washington, D. C."